United States Patent Office 3,636,195
Patented Jan. 18, 1972

3,636,195
GROWTH STIMULATING ANIMAL FEEDS
William Joye Monson, Elgin, Ill., assignor to
Borden, Inc., New York, N.Y.
No Drawing. Filed Sept. 10, 1968, Ser. No. 758,706
Int. Cl. A61k 27/00
U.S. Cl. 424—115                10 Claims

ABSTRACT OF THE DISCLOSURE

This invention relates to animal feeds containing nutritionally balanced basal feeds and a growth promoting composition consisting essentially of a feed supplement selected from the group consisting of fermentation products, distillers' products and mixtures thereof, and a taurine compound being present in amount sufficient to promote growth at a rate greater than said feed supplement alone, greater than said taurine compound above, and greater than the additive effects thereof.

BACKGROUND OF THE INVENTION

It is generally accepted that the addition of certain fermentation products and/or distillers' products to the feed of animals is effective in increasing the rate of growth of the animals. In practice, the effectiveness of standard commercial feed supplements of these types is assayed and controlled by actual feeding of experimental animals and measuring the rate of growth.

It is also known that fermentation products and distillers' products are not entirely adequate supplements particularly in poultry since they lack certain required growth factors and fish meal is added to the basal feed for maximum growth of the animal. Attempts to eliminate fish meal and to potentiate the effect of the fermentation and distillers' products have not been successful.

SUMMARY OF THE INVENTION

It has now been found that the growth increment effected by standard commercial feed supplements from fermentation or distillery sources may be increased by a factor of at least two and fish meal can be eliminated as a source of unidentified factors.

Briefly stated, the present invention comprises a growth promoting composition for addition to the basal animal diet consisting of a standard commercial feed supplement selected from fermentation and/or distillers' products, and a taurine compound; the resultant animal feed, and the method of promoting animal growth as hereinafter described.

It has surprisingly been found that levels of a taurine compound which by itself effects only minimal or negligible growth stimulation, actually synergistically increases the effect of the standard fermentation or distillers' product supplement.

DETAILED DESCRIPTION

As to materials, the basal feed can be any nutritionally adequate feed commonly used to feed animals and known to those skilled in the feed art. These feeds contain grains, fats, minerals, vitamins and the like known constituents in proportions dependent upon the animal to be fed.

The growth promoting composition is the essential constituent of the invention and consists of the combination of a fermentation and/or distillers' product and a taurine compound in the proportions hereinafter set forth.

The fermentation product and/or distillers' product can be any conventionally used in feed practice although it is preferred to use Fermacto, which is a mixture of dried extracted Streptomyces fermentation residue, corn distillers dried grains, corn distillers dried solubles, dried whey product and dried fermented corn extractives. Examples of other products that can be used are listed in "The Handbook of the Association of Feed Control Officials, Inc."; specific examples being fermentation products derived from sources including penicilium, streptomyces, citric acid, B. subtilis, A. oryzae, A. niger and the like, and of various types including extracted press cake, extracted meal, dried extracted fermentation solubles and other related classifications. In addition, said Handbook lists distillers' products such as dried solubles or dried grain, derived from corn or other grains.

The preferred taurine compound is taurine, 2-amino ethane sulfonic acid. Other taurine compounds which may be used in the practice of this invention include N-methyltaurine and its salts with inorganic bases, ammonium, and alkyl amines, taurocholic acid and taurodesoxycholic acid; and the salts of taurocholic acid and taurodesoxycholic acid with inorganic bases, ammonium, and alkyl amines.

Since taurine is an acid it will react chemically with any bases present in the feed such as ammonium hydroxide or amines, to be converted partially or completely to the corresponding salts. Taurine may also be added to the feed in the form of a salt such as sodium taurate, potassium taurate, ammonium taurate, methyl ammonium taurate or trimethyl ammonium taurate. Likewise since taurine is amphoteric and has basic properties as well as acidic, it tends to react also with acid substances, particularly with strong acids; it could therefore be introduced into the feed at least partially in the form of a salt such as taurine hydrochloride (taurinium chloride), taurinium phosphate or taurinium sulfate.

The amount of fermentation or distillers' product which is required as one of the synergistic components of this invention will, of course, depend upon the strength of the unknown growth factors contained therein. It is usually sufficient to use this supplement in the amount ranging between .125% and 0.25% by weight of total feed. The effect of these components usually reaches an optimum level beyond which additional amounts have no further effect. For example, if 0.25% of fermentation product is sufficient to be optimum there may be no further effect by increasing this amount to 0.5%. There is, however, a difference in the requirement depending upon the animal fed; for example, where 0.25% of a particular fermentation product may be sufficient to reach optimum effect in feeding of chickens, up to 0.75% may be desirable in the feeding of turkeys. Thus the feed supplement can be used in amount from 0.125% to .75% by weight of total feed. In general, distillers' dried solubles have lower content of unknown growth factors than fermentation products and in using supplements of this type it may be required to use up to 2% by weight of total diet to reach optimum levels of synergized growth. While even higher proportions of either fermentation or distillers' product could be used, it would ordinarily not be desirable for economic reasons.

In general, taurine is used in amounts varying from 0.002 to about .2% by weight of total feed; although greater amounts may be used, the growth synergizing effect is not increased thereby. Another way of expressing these proportions is as ratio of taurine to feed supplement. Since the feed supplement can be used in amount from 0.125% to .75% by weight of total feed, and taurine is used in amounts from 0.002% to 0.2% by weight of total feed, it follows that the weight ratio of taurine to feed supplement can vary from 0.002/0.75 to 0.2/.125 i.e. there can be from 0.0027 to 1.6 parts by weight of taurine per part of feed supplement. The preferred range of taurine level is between about .0025% and about 0.1% of the total feed weight. Taurine compounds other than taurine are used in amounts chemically equivalent to taurine, thus .104% sodium taurodesoxycholate corresponds to 0.025% taurine. Mixtures of several taurine compounds may be employed; for example 30/70 mixture of sodium taurate and sodium taurocholate.

The taurine compounds of this invention may be prepared either by chemical synthesis or by extraction from natural products containing them. The form in which the taurine compound is mixed with the basal feed may be the chemically pure form or the taurine compound may be diluted with water or other edible ingredients. One manner of practicing this invention is carried out by mixing a fermentation residue with a taurine compound or edible dilution thereof and subsequently adding the mixture as a supplement to a basal diet. However, the improved feed of this invention may be prepared by separately adding the taurine compound and the standard feed supplement derived from fermentation and/or distillers' products at any stage of mixing the other ingredients, as long as the requirement is met that the final mixing be sufficiently thorough to assure that all aliquots of the feed have identical composition.

While the most extensive investigations applying the conditions of this invention have been made on the growth of poultry the instant invention is applicable to the feeding of other animals, particularly species such as pigs, whose feeding requirements are generally similar to those of poultry. In addition, there are certain differences in the customary practices of feed preparation by livestock growers, depending on the nature of the livestock. For example, turkeys are usually fed diets with higher protein and higher vitamin contents than is the case of chickens and in the case of ducks the ratio of protein to carbohydrate may be gradually decreased with the age of the birds. It is also often the practice to include in the diet small amounts of various and well-known antibiotics, antiparasitics, and fat regulating compounds. Also there are naturally some variations from farm to farm in the particular composition of additives preferred even for the same type of livestock. The instant invention is not affected by such changes in basal diet. The synergistic effect of feeding a taurine compound in conjunction with a fermentation and/or distillation product supplement is additive to the specific effects of such other ingredients added to the basal feed.

The following examples are given by way of illustration and are not to be construed as limitations of this invention, many variations of which are possible within the scope and spirit thereof.

EXAMPLE 1

A basal diet was compounded according to the following composition:

Ground yellow corn—54.25 lbs.
Soybean meal 50%—38.00 lbs.
Stabilized animal fat—4.00 lbs.
Vitamin $D_3$ (1 million I.C. units/lb.)—0.05 lb.
Ground limestone—1.00 lb.
Plain salt—0.50 lb.
Defluorinated phosphate—2.00 lbs.
Manganous oxide—5.0 gms.
Menadione sodium bisulfite—100.0 mgms.
Vitamin A (325,000 units/gm.)—923.0 mgms.
Choline chloride 50%—45.36 gms.
d-Pantotehenic acid—300.0 mgms.
Niacin—1500.0 mgms.
Riboflavin (pure)—200.0 mgms.
Vitamin $B_{12}$ (pure)—0.8 mgm.
Folic acid—40.0 mgms.
Vitamin E (125,000 units/lb.)—3.63 gms.
Butyl hydroxytoluene—5.7 gms.
Zinc Oxide (73% Zn)—2.5 gms.
Calcium iodate monohydrate—0.08 gm.
Methionine hydroxy analogue—68.1 gms.
Bacitracin methylene disalicylate—200.0 mgms.

The calculated analysis of this basal diet corresponds to 23.6% protein, 1430 calories M.E./lb., 60.6 calories per percent of protein, 0.51% methionine, 0.88% methionine and crystine, 1.35% lysine, 1.13% calcium and 0.74% phosphorus.

Three aliquots of this basal diet feed were treated as follows. To the first there was added 0.25% by weight of a commercial fermentation product feed supplement, Fermacto 500. This product contains dried extracted streptomyces fermentation residue, corn distillers' dried grains, corn distillers' dried solubles, dried whey product and dried fermented corn extractives. The analysis is guaranteed to include at least 22.0% crude protein, at least 6.0% crude fat, no more than 10.0% crude fiber and no more than 20.0% ash.

To the second aliquot of base diet there was added 0.025% by weight of chemically pure taurine.

To the third aliquot there was added both 0.25% by weight of the aforedescribed Fermacto 500 and also 0.025% by weight of chemically pure taurine. Each augmented feed sample was thoroughly homogenized by mixing.

The augmented diets and the basal diet as a control were administered as part of an extensive feeding program carried out as described hereinafter.

Feeding experiments were carried out using White Mountain Broiler chicks in cages, each cage containing ten males and ten females. In populating each cage, the following procedure was used:

One-day old chicks were first segregated as to sex and weight. After elimination of extremely light and heavy birds, there remained a population divided into ten weight categories. From these categories, birds were assigned at random to the cages so that the ten males and ten females of each cage represented an approximately equal weight distribution, i.e., they were distributed approximately equally as to weight. Assignment of diets to the respective cages was made by use of a table of random numbers. The cages were supplied with raised wire floors, fluorescent lights and electric brooders which were thermostatically controlled. The battery of cages was located in a ventilated room maintained at approximately 75° F. Feed and water were supplied ad libitum. At the end of four weeks the birds were weighed and the average weights were recorded.

In the course of extensive experiments involving many different kinds of supplemented feed, fourteen cages were fed the basal diet alone, fourteen cages were fed basal diet augmented with 0.25% Fermacto 500, fourteen cages were fed basal diet augmented with 0.025% taurine, and fourteen cages were fed a basal diet augmented with both 0.25% Fermacto 500 and also 0.025% taurine. The fourteen cages in each category were each divided into four batteries, A, B, C, and D, with each battery containing four cages, with the exception of battery B which contained only 2 cages. The average weights obtained for each battery are summarized in Table I. In order to take into account seasonal variations batteries A, B, C and D were run at different times.

TABLE I

| Supplement | Cage | Wt. in grams at 28 days | | Increase due to supplement, percent |
|---|---|---|---|---|
| | | Per cage | Per diet | |
| None | A | 634 | | |
| | B | 668 | | |
| | C | 692 | | |
| | D | 674 | | |
| Average | | | 667 | |
| 0.25% Fermacto 500 | A | 640 | | |
| | B | 682 | | |
| | C | 714 | | |
| | D | 682 | | |
| Average | | | 680 | +1.95 |
| 0.025% taurine | A | 652 | | |
| | B | 654 | | |
| | C | 708 | | |
| | D | 665 | | |
| Average | | | 670 | +0.45 |
| Both 0.25% Fermacto 500 and 0.025% taurine | A | 662 | | |
| | B | 701 | | |
| | C | 711 | | |
| | D | 698 | | |
| Average | | | 693 | +3.90 |

Table I also includes the grand average of the weights corresponding to each of the respective four diets. These data indicate that supplementation of the basal diet with 0.25% Fermacto 500 results in an average increase in chick weight equal to 1.95%. This figure constitutes an assay of the effect of the fermentation product Fermacto 500 as a feed supplement. Statistical analysis of the entire data showed that this increase is "extremely significant." Data in Table I also indicate that the administration of 0.025% taurine increases the average chick weight by only 0.45%, an increment which is shown by analysis to be statistically insignificant in comparison with the spread of residual variation. In contrast with these aforementioned effects of Fermacto alone and taurine alone, the data of Table I show further that when both Fermacto 500 and taurine were included in the diet, the chick weight was increased by 3.90%, an increment which statistical analysis demonstrates to be very significant. The data of Table I therefore clearly indicate that a level of taurine which by itself had a negligible growth stimulating effect, substantially increased the growth stimulating effect of the standard fermentation product spread. In short, the administration of taurine in conjunction with the fermentation product resulted in a synergistic doubling of the growth increment.

EXAMPLE 2

In the same batteries of feeding experiments which included the cages described in Example 1, there were also included 4 batteries of four cages each to which the assigned feeds were the diets listed in Table II. This table also gives the corresponding average weights of the chicks in each cage after four weeks, and for comparison, the ranges of the cage average weights for treatments described in Example 1.

TABLE II

| Supplement: | Avg. chick wt. per battery, gms. |
|---|---|
| None (Example 1) | (634–692) |
| .25% Fermacto 500 (Example 1) | (640–714) |
| .0025% taurine | 687 |
| .025% taurine (Example 1) | (652–708) |
| .100% taurine | 696 |
| .0025% taurine plus 0.25% Fermacto 500 | 721 |
| .0025% taurine plus 0.25% Fermacto 500 | 721 |
| .025% taurine plus 0.25% Fermacto 500 (Example 1) | 662–711) |
| .100% taurine plus 0.25% Fermacto 500 | 725 |

These results indicate that when taurine was the sole supplement, no significant increase in growth stimulation was effected by increasing this supplement from .0025% to .100%, all cake averages being within the range 652–708. On the other hand, when .25% Fermacto 500 was included along with the taurine supplement, the chick weight was substantially increased beyond the increases effected by either taurine or Fermacto 500 separately. The synergistic effect of taurine upon the growth stimulation by Fermacto 500 was practically the same with only 0.0025% taurine as with .100% taurine.

EXAMPLE 3

In a repeat experiment, a fresh supply of basal diet was compounded using the formula of Example 1. Again, to 100 parts by weight of this basal diet there was added .25% Fermacto 500, to another 100 parts of the basal diet there was added .025% taurine, and to a third 100 parts of the basal diet there were added both .25% Fermacto 500 and .025% taurine. Two groups of ten male and ten female chicks were chosen at random by the method of Example 1 from broods of one-day old chicks and were fed respectively with straight basal diet and with the aforementioned three types of supplemented basal diet. After four weeks' feeding, the average weight of the chicks which had only straight basal diet was 691 grams. The average weight of the chicks whose feed was augmented with taurine only was 677 grams. The average weight of the chicks which were fed basal diet supplemented with Fermacto 500 only was 712 grams. In contrast to this, the average weight of the group of chicks which had both the Fermacto 500 and taurine was 727 grams, again substantially greater than when either Fermacto 500 or taurine was the sole supplement.

EXAMPLE 4

In the same battery of experiments described in Example 3, two groups of ten male and ten female chicks chosen at random from the same brood were fed a diet consisting of the basal diet augmented by 0.0278 part per 100 of methyl taurine. The average weight of these chicks after four weeks was 691 grams, showing no improvement over the unsupplemented basal diet. Two groups of ten male and ten female chicks chosen in the same manner were fed a diet consisting of the basal diet supplemented by .25% of Fermacto 500, using a different batch of Fermacto than that used in the previous examples. The average weight of these chicks was 712 grams. A further two groups of ten male and ten female chicks were fed a diet consisting of the basal diet supplemented by .25% of both Fermacto 500 and 0.0278% methyl taurine. The average weight of these chicks after four weeks was 722 grams, showing a substantial synergistic improvement over the effect of Fermacto 500 alone.

EXAMPLE 5

In the same battery of experiments described in Examples 3 and 4 there were included two further groups of ten male and ten female chicks fed respectively with a diet consisting of the basal diet supplemented with .111% sodium taurocholate and respectively the basal diet supplemented with both 0.111% sodium taurocholate and .25% Fermacto 500. The respective weights after four weeks' feeding were 711 grams and 734 grams, again showing very significant effect of combining both Fermacto 500 and the taurine compound over using either one alone.

EXAMPLE 6

The procedure of Example 5 is repeated, using 0.104% sodium taurodesoxycholate in place of the .111% taurocholate. A similar synergistic effect is observed when both taurine compound and fermentation residue supplement are used in conjunction.

EXAMPLE 7

One-day old Pekin ducks in replicate cages of 16 containing 8 of each sex are fed pelleted feed containing the following basal diet:

Ground yellow corn—1630 lbs.
Ground oats—60 lbs.
Soy bean meal 50%—99 lbs.
Dried whey—40 lbs.
Alfalfa meal 17%—50 lbs.
Dicalcium phosphate—30 lbs.
Ground limestone—40 lbs.
Vitamin $D_3$ (1500 units)—4 lbs.
Manganous sulfate—feed grade—0.5 lb.
Trace mineral salt (from Calcium Carbonate Co.) supplying traces of manganese, iron, calcium, copper, zinc, iodine and cobalt—0.5 lb.
Iodized salt—5 lbs.
Vitamin A (10,000 units)—272 grams
Riboflavin—3.6 grams
a-Tocopherol acetate—7 grams
Niacin—40 grams
Vitamin B–12—6.0 miligrams
Menadione—0.5 gram Respective replicate groups are fed the basal diet, the basal diet supplemented by 2% by weight of "B.Y. Basic" (a Commercial Fermentation Residue Product produced by Commercial Solvents Corporation); .025% taurine and in one case both 2% "B.Y. Basic" and .025% taurine. At the end of 40 days the ducks fed the basal diet supplemented by both "B.Y. Basic" and taurine show a statistically significant weight increase whereas the ducks fed on the other diets do not.

EXAMPLE 8

Groups of turkeys are fed respectively a typical basal turkey diet, the basal diet supplemented with .75% Fermacto 500 alone, the basal diet supplemented with .111% sodium taurocholate alone and the basal diet supplemented with a combination of .75% Fermacto 500 and .111% sodium taurocholate. The group fed the combination of both sodium taurocholate and fermentation residue supplement have an average weight significantly greater than those fed any of the other diets.

It will be understood that it is intended to cover all changes and modifications of the examples of the invention herein chosen for the purpose of illustration which do not constitute departures from the spirit and scope of the invention.

What is claimed is:

1. A growth promoting composition for addition to basal animal feeds consisting essentially of:
   (A) a feed supplement selected from the group consisting of (a) fermentation product residues derived from fermentation involving penicillium, streptomyes, *B. subtilis, A. oryzae, A. niger* or citric acid, (b) distillers' fermentation products selected from the group consisting of dried solubles and dried grains, and (c) mixtures of said feed supplements;
   (B) a taurine compound selected from the group consisting of taurine, N-methyltaurine, taurocholic acid, taurodesoxycholic acid, sodium taurate, sodium taurocholate, sodium taurodesoxycholate, potassium taurate, ammonium taurate, methylammonium taurate, trimethylammonium taurate, the salts of N-methyltaurine, taurocholic acid and taurodesoxycholic with ammonium and alkyamines, and mixtures thereof, the taurine compound being present in amount chemically equivalent to between 0.0027 to 1.6 parts by weight of taurine per part of said feed supplement.

2. The composition of claim 1 wherein the taurine compound is taurine.

3. An animal feed comprising a basal feed and the growth promoting composition of claim 1 in amount such that the amount of feed supplement (a) is between 0.125% and 0.75% by weight of total feed and the amount of taurine compound (b) is chemically equivalent to taurine in amount between 0.002% to 0.2% by weight of total feed.

4. The animal feed of claim 3, wherein the taurine compound is taurine.

5. The animal feed of claim 4, wherein the basal feed is a poultry feed.

6. The poultry feed of claim 5 wherein the feed supplement is a mixture of dried extracted streptomyces fermentation residue, corn distillers' dried grains, corn distillers' dried solubles, dried whey product and dried fermented corn extractives and wherein this feed supplement is present in an amount ranging from about 0.125% to about 0.25% by weight of total feed.

7. The method of promoting the growth of poultry and pigs which comprises administering the composition of claim 1 to said poultry and pigs.

8. The method of promoting the growth of poultry and pigs which comprises administering a nutritionally adequate amount of the feed of claim 3, to said poultry and pigs.

9. The method of promoting poultry growth which comprises administering to poultry a nutritionally adequate amount of the feed of claim 5.

10. The method of promoting poultry growth which comprises administering to poultry a nutritionally adequate amount of the feed of claim 6.

References Cited

UNITED STATES PATENTS

| | | | |
|---|---|---|---|
| 2,913,340 | 11/1959 | Chornock et al. | 424—115 |
| 2,906,622 | 9/1959 | Lewis | 424—115 |

SAM ROSEN, Primary Examiner

U.S. Cl. X.R.

424—177, 240